United States Patent [19]
Axelrod

[11] 3,716,401
[45] Feb. 13, 1973

[54] PROCESS RENDERING VINYL SURFACES SOIL RESISTANT

[75] Inventor: Robert Jay Axelrod, Claymont, Del.

[73] Assignee: E. I. du Pont de Nemours and Company, Wilmington, Del.

[22] Filed: Aug. 12, 1971

[21] Appl. No.: 171,307

[52] U.S. Cl..............117/138.8 UA, 117/139.5 A, 117/161 UB, 117/161 UC, 117/161 UF, 260/30.8, 260/31.2, 260/32.6, 260/32.8, 260/33.6, 260/89.5 R, 260/92.8 R, 260/899

[51] Int. Cl...........................B44d 5/00, B32b 27/08

[58] Field of Search..........117/138.8 UA, 139.5 A, 161 UB, 117/161 UC, 161 UF; 260/92.8 R, 89.5 R, 29.6 F

[56] References Cited

UNITED STATES PATENTS

| | | | |
|---|---|---|---|
| 2,642,416 | 6/1953 | Ahlbrecht et al | 117/139.5 |
| 3,054,695 | 9/1962 | Loeb et al | 117/139.5 X |
| 3,102,103 | 8/1963 | Ahlbrecht et al | 260/29.6 |
| 3,504,016 | 3/1970 | Smeltz | 117/161 X |
| 3,527,742 | 9/1970 | Pittman et al. | 117/138.8 |
| 3,660,360 | 5/1972 | Ray-Chaudhun et al | 117/139.5 X |

Primary Examiner—William D. Martin
Assistant Examiner—Sadie L. Childs
Attorney—Francis J. Crowley

[57] ABSTRACT

A process for rendering vinyl surfaces resistant to soiling and readily cleanable by application thereto of a polymeric surface coating comprising a vinyl polymer in a volatile solvent and from about 0.2 percent to about 0.7 percent by weight of carboxylic esters of 2-perfluoroalkylethanol having the formula $C_nF_{2n+1}CH_2CH_2OH$ wherein n is from 6 to 14.

6 Claims, No Drawings

PROCESS RENDERING VINYL SURFACES SOIL RESISTANT

BACKGROUND OF THE INVENTION

1. Field of the Invention

This invention relates to a process for rendering vinyl surfaces soil resistant by applying to said surfaces a polymeric coating composition consisting essentially of from about 5 to 25 percent by weight of a vinyl polymer in a volatile solvent and from about 0.2 to 0.7 percent by weight of -perfluoroalkylethanol malonic, o-phthalic or camphoric esters of 2-perfluroalkylethanol having the formula $C_nF_{2n+1}CH_2CH_2OH$ wherein n is from 6 to 14. This process is particularly useful for coating vinyl surfaces such as vinyl automobile roofs.

2. Description of the Prior Art

In recent years, the use of vinyl fabric covering on automobile roofs has become quite popular. The vinyl fabric used for automobile roof coverings is usually a laminate of a sheet of polyvinyl chloride and a suitable fabric. The vinyl fabric is applied to the painted roof of the automobile with adhesives and then coated with a protective top-coating vinyl polymer composition. The popularity of these automobile vinyl roofs stems from the enhanced aesthetics in automobile styling. In order to obtain the desired aesthetic effect, the vinyl fabrics used for vinyl roofs are usually given granular relief surfaces by surface molding or embossing.

A problem associated with such vinyl roofs is the soiling which takes place thereon upon atmospheric exposure. The soiling problem is obviously accentuated when the vinyl fabric is white or light-colored because the soiling is more visible. The embossed nature of the majority of these vinyl roofs makes the cleaning more difficult and, in time, permanent discoloration due to deposited soil tends to occur. Cleaning of the vinyl roofs with organic solvents is usually not recommended because of the possible removal of the protective lacquer surface and possibly even a portion of the vinyl fabric itself.

A process has now been discovered which renders vinyl surfaces, such as vinyl sheets used in making automobile vinyl roofs, resistant to soiling and readily cleanable.

SUMMARY OF THE INVENTION

This invention is directed to a process for rendering vinyl surfaces soil resistant and comprises applying to the vinyl surfaces a polymeric coating composition consisting essentially of a. from about 5 to about 25 percent by weight of a vinyl polymer or mixture of vinyl polymers in a volatile solvent; and
b. from about 0.2 to about 0.7 percent by weight based on the weight of the polymer in (a) of one or more carboxylic esters of 2-perfluoroethanol having the formula $C_nF_{2n+1}CH_2CH_2OH$ wherein $n$ is from 6 to 14.

The ester of (b) is a stearic, malonic, o-phthalic or camphoric ester or a mixture of any of these.

DESCRIPTION OF THE INVENTION

This invention relates to a process for rendering vinyl surfaces, such as vinyl sheets, resistant to soiling and readily cleanable by applying to said vinyl surface a top-coating composition containing from about 5 to about 25 percent by weight of vinyl polymer such as poly(vinyl chloride) or poly(methyl methacrylate) or a mixture thereof in a volatile solvent based on the total weight of the vinyl polymer and the solvent and from about 0.2 to about 0.7 percent by weight of one or more carboxylic esters of 2-perfluoroethanol of the formula $C_nF_{2n+1}CH_2CH_2OH$ wherein n is from 6 to 14 and said ester being selected from the group consisting of 2-perfluoroalkylethyl stearate, 2-perfluoroalkylethyl malonate, 2-perfluoroalkylethyl o-phthalate and 2-perfluoroalkylethyl camphorate based on the weight of the vinyl polymer.

The term "vinyl surface" is used herein to include surfaces made from thermoplastic polymers commonly known as vinyl polymers. For purposes of convenience, vinyl sheets will be used herein to exemplify vinyl surfaces, however, the instant process has equal applicability to similar vinyl surfaces in other than sheet form. The term "sheet" as used herein refers to a portion of sheeting which in turn is a term used for a continuous film of greater than 0.10 in. thickness ("Concise Guide to Plastic," H. R. Simonds and J. M. Church, Reinhold Publishing Corp., 2nd Edition, 1963, p. 96). Vinyl polymers are "polymers derived by polymerization or copolymerization of vinyl monomers (vinyl compounds) including vinyl chloride and acetate, vinylidene chloride, methyl acrylate and methacrylate, acrylonitrile, styrene and vinyl ethers and numerous others characterized by the presence of a carbon double bond in the monomer molecule which opens during polymerization to make possible the carbon chain of the polymer" (The Condensed Chemical Dictionary, 6th Edition, A & E Rose, Reinhold Publishing Co., N.Y., 1961). Thus the vinyl sheets include sheets prepared from such polymers as poly(vinyl chloride), copolymer of vinyl chloride and vinyl acetate, poly(vinylidene chloride), copolymer of vinylidene chloride with vinyl chloride, copolymer of vinylidene chloride with acrylonitrile, copolymer of vinylidene chloride with methyl acrylate, copolymer of vinylidene chloride with methyl methacrylate, copolymer of vinyl chloride with methyl acrylate, copolymer of vinyl chloride with methyl methacrylate and polyvinyl acetates. The copolymers of vinyl chloride with vinyl acetate are most commonly used in the vinyl sheets. The amount of vinyl acetate in the copolymer usually varies from about 5 to 20 percent depending upon the degree of flexibility desired. The sheet may be made entirely of vinyl polymer or may be a laminate of vinyl polymer sheet on a suitable fabric such as that of cotton, linen or synthetic fibers or a sheet may be a fabric coated with a vinyl polymer.

As stated previously, in preparing vinyl automobile roofs a vinyl fabric is adhered to the painted roof and the vinyl fabric is then coated with a protective top-coating vinyl polymer composition. This polymeric protective coating composition is usually a solution of a vinyl polymer or a mixture of vinyl polymers in a volatile solvent and is applied to the surface of the vinyl fabric sheet in any suitable manner. It is applied to the vinyl sheets to protect them from deterioration, abrasion and the like. As stated above, the protective coating composition is applied to the vinyl sheets as a solution in a volatile solvent and the solvent evaporation which follows leaves behind a coalesced top-coating of vinyl polymers. Suitable for use volatile solvents for a top-coating protective composition are ketones such as acetone, methyl ethyl ketone, aromatic hydrocarbons such as benzene, toluene, xylene, cyclic ethers such as tetrahydrofuran, esters such as ethyl acetate, butyl acetate, chlorinated hydrocarbons such as methylene chloride, carbon tetrachloride as well as other known solvents for vinyl polymers such as dimethyl formamide, dimethyl sulfoxide and ethylene carbonate. A typical protective coating composition would be a solution of a mixture of poly(vinyl chloride) and poly(methyl methacrylate) in methyl ethyl ketone. The concentration of the polymer in the composition may be from about 5 to about 25 percent by weight and the proportion of poly(vinyl chloride) in the polymer mixture may be from about 25 to about 75 percent of the polymer mixture. The protective coating composition may also contain known polymer adjuvants such as thermal stabilizers, ultraviolet stabilizers, plasticizers, antioxidants, dyes, pigments and the like, and it may be applied to the vinyl sheet in any of the conventional art-known ways such as spraying, dipping, or brushing.

Despite this protective top-coating composition, however, vinyl sheets, particularly vinyl sheets used as automobile roof covering, are susceptible to soiling due to a combination of atmospheric dust, soot, sprays and the like. Soiling is particularly noticeable and objectionable on light-colored or white vinyl roofs. It is also known that upon atmospheric ageing, the tendency towards soiling and the difficulty in cleaning of the vinyl roof are also increased.

The process of the present invention is carried out by applying to the surface of vinyl sheets, a polymeric surface coating composition consisting essentially of a polymeric protective coating composition as described previously and form about 0.2 to about 0.7 percent of a stearic, malonic, o-phthalic or camphoric ester of 2-perfluoroalkylethanol of the formula $C_nF_{2n+1}CH_2CH_2O$H wherein $n$ is from 6 to 14 or a mixture of any such esters. When the amount of fluorinated ester is less than about 0.2 percent, the soil resistance and cleanability is less than desired possibly because of insufficient amount of fluorinated compound present. The use of fluorinated compound in excess of about 0.7 percent, while not prohibited, fails to serve any apparent further useful purpose in reducing resistance or in cleanability. The polymeric surface coating composition containing the designated esters may be applied in any of the art-known ways, in which the previously discussed protective coating can be applied, preferable as a solution in volatile organic solvents. Thus the fluorinated esters useful in the invention may be dissolved in a solvent such as methyl ethyl ketone together with the polymeric component of the surface coating composition, e.g., polyvinyl chloride or polymethyl methacrylate or a mixture of the two and the solution of the surface coating composition thus prepared may then be applied to the vinyl sheets in any conventional manner such as by spraying, brushing, or dipping.

The amount of the fluorinated esters used is such that upon evaporation of the volatile solvent, the fluorinated ester will be from about 0.2 to about 0.7 percent by weight based on the weight of the polymeric component. The concentration of the polymeric material in the solution is usually from about 5 to about 25 percent and the coalesced coating film which is effected is normally of about 1 mil thickness. Of course, as is known, the thickness of the film may be varied by varying the concentration of the polymeric component or by increasing the number of coatings applied.

The vinyl sheets made soil resistant and readily cleanable by the process of the present invention, retain these properties of soil resistance and cleanability upon atmospheric exposure for prolonged periods of time. Tests have been conducted which showed that after 100 hours of accelerated weathering, i.e., 100 one hour cycles in "Atlas Weather-Ometer" wherein the treated vinyl sheets were continuously subjected to light of carbon arc through Corex D glass filters and during 8 minutes of each one hour cycle, subjected to a spray of water, the vinyl sheets still maintained soil resistance and cleanability.

The 2-perfluoroalkylethyl carboxylates used in the process of this invention may be prepared from 2-perfluoroalkylethanol and the corresponding carboxylic acid by art-known procedures, such as esterification using p-toluene-sulfonic acid or sulfuric acid as a catalyst. The 2-perfluoroalkylethanols of the formula $C_nF_{2n+1}CH_2CH_2OH$ wherein $n$ is from 6 to 14, and preferably a mixture of 2-perfluoroalkylethanols whose values of n are as described above. 2-Perfluoroalkylethanols may be prepared by hydrolysis with oleum of 2-perfluoroalkylethyl iodides, $C_nF_{2n+1}CH_2CH_2I$, as described in U.S. Pat. No. 3,283,012. The 2-perfluoroalkylethyl iodides may be prepared by the reaction of perfluoroalkyl iodide with ethylene (Haszeldine, J. Chem. Soc. 2856 [1949]; 2789 [1950]). The preparation of perfluoroalkyl iodides is described in U.S. Pat. Nos. 3,132,185 and 3,234,294. The perfluoroalkyl iodides prepared according to these patents are usually a mixture of perfluoroalkyl iodides since the process of preparation is a telomerization reaction using tetrafluoroethylene and thus each perfluoroalkyl iodide differs by-$(CF_2-CF_2)$-unit. Thus to produce the compounds used in the process of the present invention wherein the number of carbon atoms in the perfluoroalkyl portion of the molecule is in the range of 6 to 14, removal of perfluoroalkyl iodides boiling below about 116°–119° C. (atmospheric boiling point of $C_6F_{13}I$) and above about 93°–97° C. at 5 mm. pressure (5 mm. pressure boiling range of $C_{14}F_{29}I$) is carried out. This yields a mixture of perfluoroalkyl iodides wherein the number of carbon atoms in the perfluoroalkyl portion of the molecule is in the range of 6 to 14 carbon atoms.

It is recognized in the art that certain fluorinated compounds are useful in decreasing soiling, e.g., fabrics, because of the oil and water repellency characteristics of the fluorinated compounds. It is also generally recognized that for a fluorinated compound to exhibit significant oil repellency, the compound must possess a perfluoroalkyl chain of at least 3 carbon atoms, i.e., $CF_3CF_2CF_2-$.

One might therefore expect that by incorporating fluorinated compounds containing perfluoroalkyl groups of greater than three carbon atoms in the protective polymeric top-coating composition described previously, the vinyl sheets treated with the resultant composition would be rendered resistant to soiling. It has been found, however, that the mere presence of highly fluorinated compounds or the increasing of the amount of highly fluorinated compounds in fact is not effective in imparting soil resistance to vinyl sheets. For example, a test was conducted (Example 3) wherein 0.25 and 1 percent of a mixture of perfluorocarbons of 12 to 32 carbon atoms was added to a mixture of poly(vinyl chloride) and poly(methyl methacrylate) used as a protective coating on vinyl sheets and the soiling which resulted was only slightly less than that which occurred when the protective coating which did not contain any perfluorocarbons was used. Moreover, a slightly greater amount of soil remained on the perfluorocarbon-treated vinyl sheet than on the other sheet.

It is therefore an unexpected discovery that when vinyl sheets are treated with polymeric surface coating composition containing specific carboxylic esters of 2-perfluoroalkylethanol of the formula $C_nF_{2n+1}CH_2CH_2OH$ wherein $n$ is from 6 to 14, i.e., 2-perfluoroalkylethyl stearate, 2-perfluoroalkylethyl malonate, 2-perfluoroalkylethyl-o-phthalate and 2-perfluoroalkylethyl camphorate, the vinyl sheets are resistant to soiling and are readily cleanable. The efficacy of the above-named esters in rendering vinyl sheets soil resistant and readily cleanable is even more surprising since the carboxylic esters prepared from the same fluoro-alcohol (and therefore containing the same perfluoroalkyl groups) and carboxylic acids of the same homologous series as the acids used for the esters named above were tested and found to be either greatly inferior or totally ineffective (Example 3).

It should be understood that while the present description is written in terms of rendering automobile vinyl roofs resistant to soiling and readily cleanable, the inventive process is equally applicable to other vinyl sheet coverings such as those for furniture, automobile seats, automobile dash, outdoor umbrellas, tents, vinyl wall covering and the like. It is likewise clear that the incorporation of the useful fluorinated esters into other top-coating compositions such as lacquers, varnishes, paints and the like would render other surfaces such as that of wood, metal, plastics and the like equally resistant to soiling and readily cleanable.

EXAMPLES

The following examples are intended to be merely illustrative of the invention and not in limitation thereof. Unless otherwise indicated, all quantities are by weight.

EXAMPLE 1

The preparation of 2-perfluoroalkylethyl carboxylates is illustrated by the following preparation of 2-perfluoroalkylethyl stearate. Perfluoroalkylethanol (4765 g.) which was a mixture of 2-perfluoroalkylethanols containing 8 to 16 carbon atoms (six to 14 carbon atoms in the perfluoroalkyl portion of the molecule) and whose average molecular weight was 487, stearic acid (2845 g.) and benzene (1250 g.) were placed in a reaction flask. The charge was slowly heated and when the temperature was about 55° C., p-toluene sulfonic acid (0.8 g.) and sulfuric acid (96 percent, 6.5 g.) were added to the flask. Heating was continued and at about 87° C., benzene began to reflux and water was separated from benzene in a modified Dean Stark trap wherein the benzene was returned to the flask. The pot temperature gradually rose to 109° C. over an 11 hour reaction period, during which time water was continuously removed. The reaction mass was then cooled to about 95° C. and 440 g. of 10 percent sodium carbonate solution was slowly added over a period of about two hours. The reaction mass was again heated to remove water and the residual benzene was removed at around 88° C. at 20 mm. Hg. pressure. The reaction mass was filtered at around 90° C. to yield 6944 g. (93 percent yield) of 2-perfluoroalkylethyl stearate. The product was light tan solid which melted in the temperature range of 42°–48° C. Ester Number found 76.0, 75.6; Calculated 72.0; Acid Number found 0.03, 0.03; Calculated 0.

Using the procedure and the 2-perfluoroalkylethanols as described above, the following 2-perfluoroalkylethyl esters were prepared:

| Perfluroalkylethyl ester of | Ester No. (Theory) | Acid No. | Yield % | Melting Range (°C.) |
|---|---|---|---|---|
| a. Acetic acid | 102 (106) | 0.5 | 91 | 23–24 |
| b. Octanoic acid | 95.9 (91.5) | 1.3 | 95 | 33–35 |
| c. Decanoic acid | 91.8 (87.6) | 0.5 | 93 | 30–32 |
| d. Lauric acid | | | 96 | 35–38 |
| e. Palmitic acid | | | 92 | 49–50 |
| f. Delta-chlorovaleric acid | | 1.2 | 95 | 40–42 |
| g. Oleic acid | 78 (75) | 3.0 | 90 | 28–30 |
| h. Linoleic acid | 79.4 (74.9) | 4.3 | 95 | 22–27 |
| i. Malonic acid | 114 (108) | 0.1 | 93 | 31–33 |
| j. Succinic acid | 112 (106) | 0.9 | 85 | 35–38 |
| k. Adipic acid | 109 (103) | 0.7 | 90 | 35–38 |
| l. Suberic acid | 107 (101) | 1.3 | 83 | 43–48 |
| m. Sebacic acid | 104 (98) | 3.1 | 92 | 45–52 |
| n. Dodecanedioic acid | 103 (96) | 1.5 | 93 | 52–58 |
| o. Tridecanedioic acid | 119 (95) | 1.7 | 92 | 51–54 |
| p. Maleic acid | 119 (106) | 0.9 | 95 | 28–32 |
| q. Azelaic acid | 107 (100) | 0.5 | 95 | 35–39 |
| r. Itaconic acid | 101 (105) | 1.9 | 91 | 45°48 |
| s. Benzyl malonic | 91 (99) | 0.2 | 96 | 40–42 |
| t. o-Phthalic acid | 101 (101) | 0.395 | 25–27 | |
| u. d,l-Camphoric acid | — | 1.7 | 95 | 34–36 |
| v. Citric acid | 93 (100) | 4.8 | 86 | 42–48 |

EXAMPLE 2

This example shows the contact angle measurements on films of 2-perfluoroalkylethyl esters. Contact angle is a measure of intrinsic repellency of a surface. The higher contact angles indicate higher repellency. Water was used as the liquid to indicate water repellency while hexadecane was used as the liquid to indicate oil repellency. The fluoro-alkylethyl esters were applied to glass slides by melting the sample and spreading the melt on the slide. Contact angle (advancing) measurements were carried out in the usual way at 25° C., i.e., sessile drop method of Poynton and Thomson. The results are summarized below:

Contact Angle Measurements on Melt Coatings of Esters of $C_nF_{2n+1}CH_2CH_2OH$ ($n$ from 6–14)

| Ester | Advancing Contact Angle ° at 25°C. | |
|---|---|---|
| | Water | Hexadecane |
| 1. bis-maleate | 109 | 76 |
| 2. bis-adipate | 110 | 76 |
| 3. bis-subecate | 122 | 86 |
| 4. bis-succinate | 120 | 70 |
| 5. bis-malonate | 109 | 81 |
| 6. bis-sebacate | 126 | 92 |
| 7. bis-dodecandioate | 119 | 83 |
| 8. bis-azelate | 125 | 65 |
| 9. tris-citrate | 127 | 85 |
| 10. stearate | 123 | 75 |

11. bis-itaconate　　105　　75

The contact angle measurements considered together with the results of Example 3 show that the soil resistance and cleanability effects of the 2-perfluoroalkylethyl esters are not predictable on the basis of wetting characteristics of the esters. While it might be expected that compositions having higher contact angles would be more soil resistant and easier to clean, it is clear from the results of Example 3 that such a generalization has no basis in fact.

EXAMPLE 3

This example illustrates the unexpected utility of the 2-perfluoroalkylethyl esters of stearic, malonic, o-phthalic, and camphoric acid in rendering vinyl sheets resistant to soiling and readily cleanable.

A vinyl sheet of untreated polyvinyl chloride laminate on cotton fabric such as those used to cover automobile roofs, was obtained from Inmont Co. The vinyl sheet was cut into 7 in. squares. Solutions of top-coating composition were prepared by dissolving amounts of 2-perfluoroalkylethyl esters in solutions of 4.5 percent by weight of polyvinyl chloride and 10.5 percent by weight of polymethyl methacrylate in methylethyl ketone such that the 2-perfluoroalkylethyl ester comprised 0.25 and 1 percent by weight of the resins in the top-coating composition. The top-coating composition (4 g.) was placed on the vinyl fabric square and evenly distributed on the surface by drawing down with a glass rod. The treated vinyl fabric was allowed to dry in air. The coating on the vinyl fabric was about 1 mil thick. Control samples of coated vinyl fabrics were prepared by coating with a top-coating composition as described above which did not contain fluorinated esters.

Resistance to dry soiling and cleanability were tested by a method perfected by the Ford Motor Company. The procedure is as follows:

A sample, 5 × 5 inches, of each treated fabric is prepared. A light reflectance reading is taken using the Colormaster Differential Colorimeter, Meeco Instrument Manufacturing and Engineering Equipment Corp., Warrington, Pennsylvania, using the filter which gives the highest reflectance reading. A 5 × 5 inch card stock template having a 1 × 1 inch square hole in the center is then placed on the sample and 0.1 g. of synthetic soil is applied through a 40 mesh sieve. The sample, template and covering 96 ×100 thread white cotton cloth are then clamped to a 4 × 6 × ¾ inch urethane foam block and placed in a pilling tester (Custom Scientific Instruments, Inc., Arlington, New Jersey, Catalog No. CS–53041). A 2 × 2 × ¾ inch urethane foam block covered with the same cotton cloth is placed in the floating rack. The floating block is passed back and forth over the covered test sample for two minutes. The pilling tester machine requires modification to take the urethane foam blocks. Loose soil is then removed from the sample by holding a 50 psi. air nozzle on the fabric and moving it back and forth over the fabric once each in the warp and fill directions. A reflectance reading is then taken in the soil area. The percent soiling is then determined by the equation $$\text{Percent soiling} = \frac{(R_1 - R_2) \times 100}{R_1}$$

where $R_1$ is reflectance before soiling and $R_2$ after soiling.

The synthetic soil used in this instance was the so-called "Cyanamid Soil" and had the following composition:

| Material | Weight % |
| --- | --- |
| Peat moss | 38 |
| Cement | 17 |
| Kaolin Clay | 17 |
| Silica, 200 mesh | 17 |
| Furnace Black | 1.75 |
| Red iron oxide | 0.50 |
| Mineral Oil | 8.75 |

To measure cleanability of the soiled sample, the soiled vinyl square is mounted on the pilling machine. Urethane cleaning sponges are prepared by placing in a modified pilling floating rack, and 2 ml. of "Kar Kleen" (Ford Motor Co.) is applied to the sponge. The floating rack and sponge are placed on the soiled fabric and cleaned for 4 minutes. The sample is then rinsed in distilled water at room temperature for 10 seconds, excess water is blotted and the fabric is dried in an oven at 180°F. with a wire screen placed over the specimen to prevent curling. Reflectance reading of the cleaned area is then taken as above. The percent cleaning is then determined by the equation $$\text{Percent cleaning} = \frac{(R_1 - R_3) \times 100}{R_1} \text{ where}$$

$R_3$ = reading after cleaning and $R_1$ = original reading.

SOILING AND CLEANABILITY OF VINYL SHEETS

| Additive concentration | % soiled | | % soiled after cleaning | |
| --- | --- | --- | --- | --- |
| | 0.25% | 1.0% | 0.25% | 1.0% |
| A. Monoesters of 2-perfluoroalkylethanol | | | | |
| 1. acetate | 32.2 | 28.0 | 9.3 | 8.6 |
| 2. octanoate | 29.9 | 27.6 | 7.9 | 7.9 |
| 3. laurate | 24.2 | 24.6 | 6.1 | 8.8 |
| 4. stearate | 13.9 | 24.3 | 4.9 | 9.6 |
| 5. oleate | 26.7 | 30.2 | 8.2 | 12.6 |
| 6. eicosanoate | 24.8 | 27.1 | 9.0 | 12.3 |
| B. Bis esters of 2-perfluoroalkylethanol | | | | |
| 7. oxalate | 20.9 | 13.7 | 9.0 | 7.1 |
| 8. malonate | 12.1 | 20.7 | 4.6 | 7.5 |
| 9. adipate | 22.1 | 22.8 | 8.4 | 6.4 |
| 10. suberate | 21.3 | 28.6 | 8.8 | 9.5 |
| 11. azelate | 24.8 | 22.3 | 8.6 | 7.6 |
| 12. dodecanedioate | 20.1 | 30.4 | 7.0 | 14.5 |
| 13. o-phthalate | 16.8 | 19.0 | 4.2 | 4.2 |
| 14. d, 1-camphorate | 13.8 | 18.1 | 3.3 | 5.5 |
| C. tris ester of 2 perfluoroalkylethanol | | | | |
| 15. Citrate | 25.1 | 21.3 | 9.7 | 6.8 |
| D. other fluorinated Compounds | | | | |
| 16. -perfluoroamyl-methyl malonate | 35.2 | | 6.4 | |
| 17. $C_{12}$—$C_{32}$ perfluorocarbon | 24.3 | 21.3 | 9.7 | 6.8 |
| 18. 2-perfluoroalkyl ethanol | 26.2 | 20.6 | 10.6 | 6.0 |
| E. Control | 30.2 | 30.2 | 7.1 | 7.1 |

This example shows at 0.25 percent level, the unexpected utility of the 2-perfluoroalkylethyl esters of stearic acid (No. 4), malonic acid (No. 8), o-phthalic acid (No. 13) and camphoric acid (No. 14) in rendering vinyl sheets resistant to soiling and readily cleanable. The results as summarized in the Table show the following:

1. There appears to be no correlation between the fluorine content of the esters and the soiling resistance, considering each of the monoesters at 0.25 percent level it can be seen that the acetate (No. 1), octanoate (No. 2) and laurate (No. 3) would contain greater percentages of fluorine per unit weight than the stearate (No. 4), however greater soiling is found with Nos. 1, 2, and 3. It is also seen that the cleanability of the stearate ester is also superior to the acetate, octanoate or laurate. Similarly with the bis and tris esters, oxalate (No. 7) and malonate (No. 8), o-phthalate (No. 13) or camphorate (No. 14), yet the soil resistance with the oxalate and the citrate is considerably poorer.

2. There also appears to be no correlation between soil resistance and the size of the carboxylic acid used. For example, when 2-perfluoroalkylethyl esters, $C_nF_{2n+1}CH_2CH_2OOR$ ($n$ = mixture of 6 to 14) where R is acetyl, octanoyl, dodecanoyl and stearoyl, are compared at the level of 0.25 percent by weight of the polymeric component of the surface coating composition, the expectation is that the oil repellency, and hence soiling, should decrease in the order of esters listed since the perfluoroalkyl groups are the same and because of the lower molecular weights of acetate, octanoate, and dodecanoate as compared to that of the stearate, the molar concentration of the perfluoroalkyl groups on the surface would also decrease in the order listed; however, it can be seen that while the stearate is outstanding in soil resistance, the esters prepared from carboxylic acids which have fewer carbon atoms, e.g., acetate, octanoate, laurate, and those which have a greater number of carbon atoms, e.g., eicosanoate, are considerably poorer.

3. Comparison of the effective 2-perfluoroalkylethyl -stearate, -malonate, -o-phthalate and -camphorate with the compounds under D (other fluorinated compounds) also points out the unexpected nature of the present invention. No. 16 is a malonate ester of $C_5F_{11}CHOH$ which differs from the 2-perfluoroalkylethanol in having only one methylene group ($-CH_2-$) between the perfluoroalkyl group and the hydroxyl group. It can be seen that No. 16 is no better than the control (no additive) in soil resistance. The perfluorocarbon (No. 17) is equally ineffective. The 2-perfluoroalkylethanol (No. 18) which supplies the highly fluorinated portion of the molecule to the esters is also equally ineffective.

EXAMPLE 4

This example illustrates that the soil resistance and cleanability imparted to the vinyl fabric by the compounds useful in this invention is durable to weathering. It is clear that soil resistance and cleanability of vinyl fabric is of little practical value if such effects are readily lost upon weathering. The vinyl squares treated as described in Example 3 were subjected to accelerated weathering in "Atlas Weather-Ometer" (Atlas Electrical Devices Co., Chicago, Illinois) for 100 one hour cycles. The test vinyl squares were continuously subjected to light of carbon arc passed through Corex D glass filters, and during 8 minutes of each one hour cycle, subjected to a spray of water. The weathered vinyl squares were then subjected to soiling and cleanability test as described in Example 3. The results are summarized in the following Table.

SOILING AND CLEANABILITY OF VINYL SHEETS AFTER ACCELERATED WEATHERING

| Additive Concentration | % Soiled | | % Soiled after Cleaning | |
|---|---|---|---|---|
| | 0.25 | 1.0 | 0.25 | 1.0 |
| 2-Perfluoroalkylether ester | | | | |
| 1. Malonate | 24.6 | 23.9 | 5.8 | 6.5 |
| 2. O-phthalate | 27.8 | 27.1 | 6.3 | 7.1 |
| 3. Camphorate | 30.4 | 31.2 | 8.0 | 7.0 |
| 4. Control (no additive) | 49.2 | 49.2 | 15.5 | 15.5 |

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A process for rendering a vinyl surface soil resistant which comprises applying to said surface a polymeric coating composition consisting essentially of:
   a. from about 5 to about 25 weight percent of a vinyl polymer or mixture of vinyl polymers in a volatile solvent, and
   b. from about 0.2 to about 0.7 weight percent of a carboxylic ester or mixture of esters of 2-perfluoroethanol having the formula $C_nF_{2n+1}CH_2CH_2OH$ wherein n is 6 to 14, based on the weight of the vinyl polymer in (a); said ester or mixture of esters being selected from the group consisting of stearic, malonic, o-phthalic and camphoric esters and mixtures thereof.

2. A process according to claim 1 wherein the vinyl polymer is polyvinyl chloride or polymethyl methacrylate or a mixture thereof.

3. A process according to claim 2 wherein the vinyl polymer is a mixture of polyvinyl chloride and polymethyl methacrylate.

4. A process according to claim 3 wherein the polyvinyl chloride is present in amounts of from about 25 to about 75 percent by weight of the mixture.

5. A process according to claim 1 wherein the volatile solvent is selected from the group consisting of ketones, aromatic hydrocarbons, chlorinated hydrocarbons, cyclic ethers, dimethyl formamide, dimethyl sulfoxide, ethylene carbonate, ethyl acetate and butyl acetate.

6. A process according to claim 5 wherein the volatile solvent is selected from the group consisting of acetone, methyl ethyl ketone, benzene, toluene, xylene, tetrahydrofuran, ethyl acetate, butyl acetate, methylene chloride, carbon tetrachloride, dimethyl formamide, dimethyl sulfoxide and ethylene carbonate.

* * * * *